Jan. 17, 1939.   A. P. ARMINGTON   2,144,042
INTERCHANGEABLE VEHICLE CHASSIS AND BODY
Filed March 13, 1936    3 Sheets-Sheet 1

*INVENTOR*
ARTHUR P. ARMINGTON
BY Brockett, Hyde, Higley & Meyer
*ATTORNEYS*

Jan. 17, 1939.  A. P. ARMINGTON  2,144,042
INTERCHANGEABLE VEHICLE CHASSIS AND BODY
Filed March 13, 1936  3 Sheets-Sheet 2

INVENTOR
ARTHUR P. ARMINGTON
BY
Brockett, Hyde, Higley & Meyer
ATTORNEYS

Jan. 17, 1939.  A. P. ARMINGTON  2,144,042
INTERCHANGEABLE VEHICLE CHASSIS AND BODY
Filed March 13, 1936   3 Sheets—Sheet 3

INVENTOR
ARTHUR P. ARMINGTON
BY
Brockett, Hyde, Higley & Meyer
ATTORNEYS

Patented Jan. 17, 1939

2,144,042

UNITED STATES PATENT OFFICE 2,144,042

INTERCHANGEABLE VEHICLE CHASSIS AND BODY

Arthur P. Armington, Willoughby, Ohio, assignor to The Euclid Road Machinery Company, Euclid, Ohio, a corporation of Ohio Application March 13, 1936, Serial No. 68,634

4 Claims. (Cl. 214—1)

This invention relates to a system of co-ordinated parts for transportation and distribution of goods. The invention contemplates transportation by both rail and highway, and includes rail and highway chassis and load container bodies detachably mountable on either type of chassis.

The general objects of the invention are to provide improved chassis and elements from which the vehicles may be selectively assembled as described, and the invention embraces novel features to this end, and particularly to provisions for the assembly as will appear.

The invention contemplates the employment of bottom dump bodies and includes as a further object the cooperative employment of chassis frames of such form that such a body may be dumped while mounted upon its chassis. The invention also includes as still another object, mounting such bottom dump body in elevated position upon a stationary frame for dispensation of its contents in successive portions; and provides such interlocking relation between body and chassis that a similar relation may serve to mount the body on the stationary dispensing frame.

Figure 1:
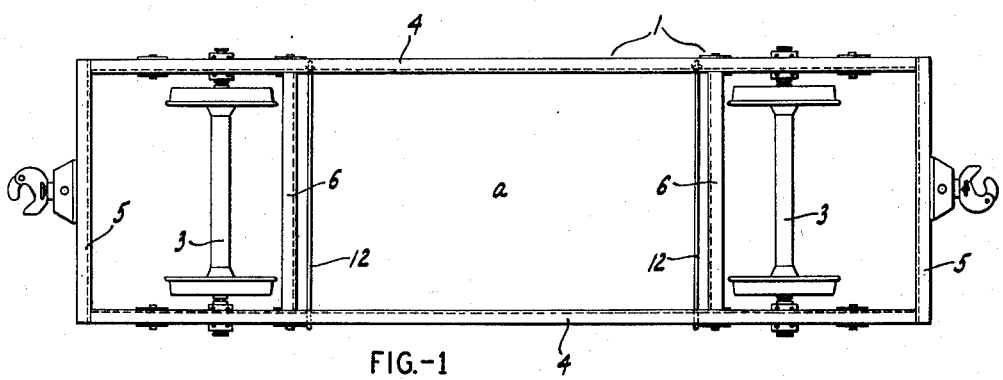
Figure 2:
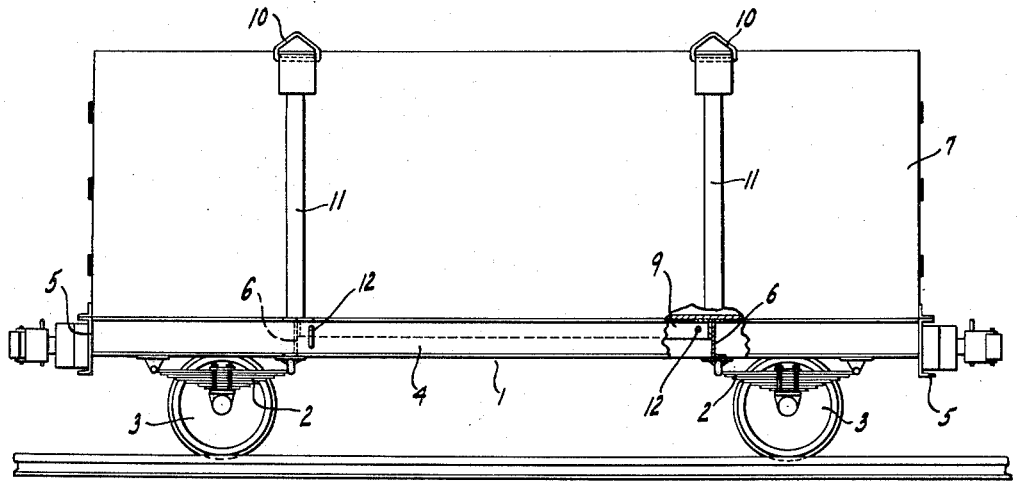
Figure 3:
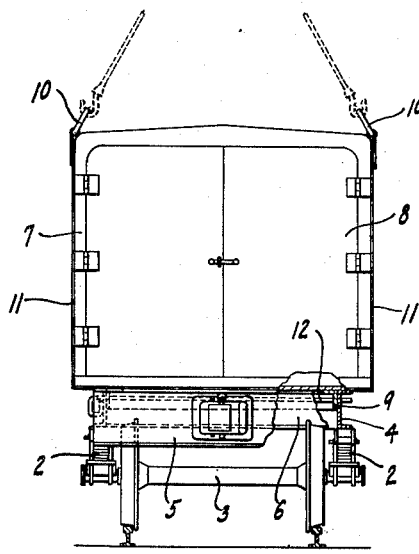
Figure 4:
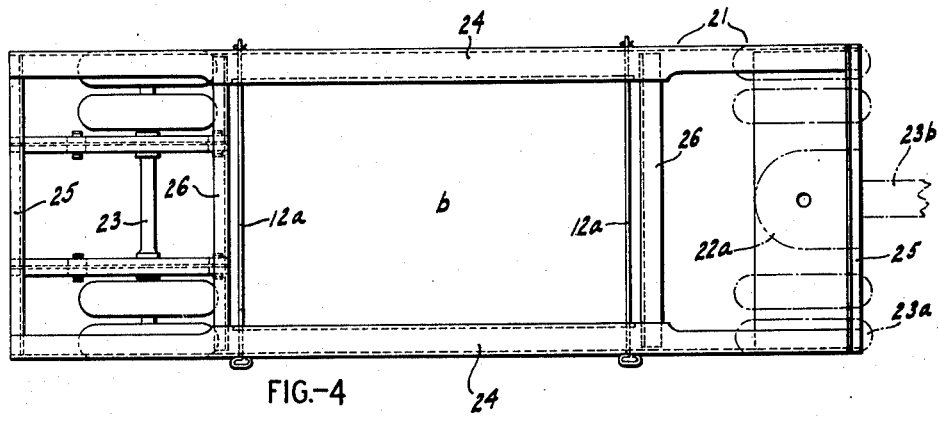
Figure 5:
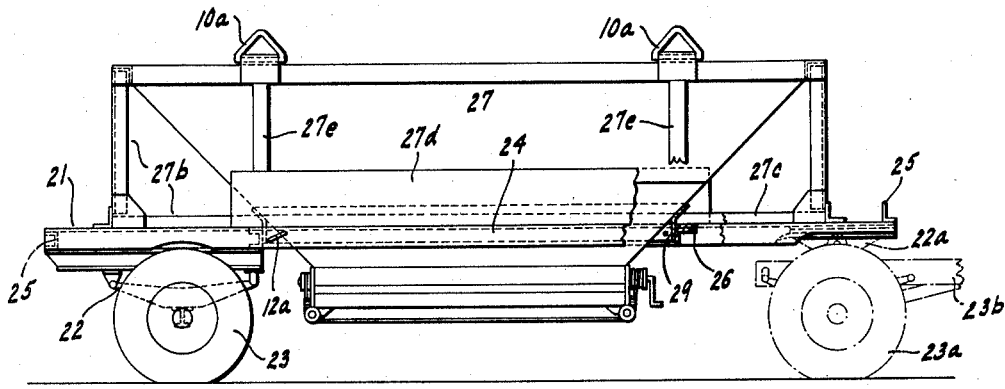
Figures 6, 7:
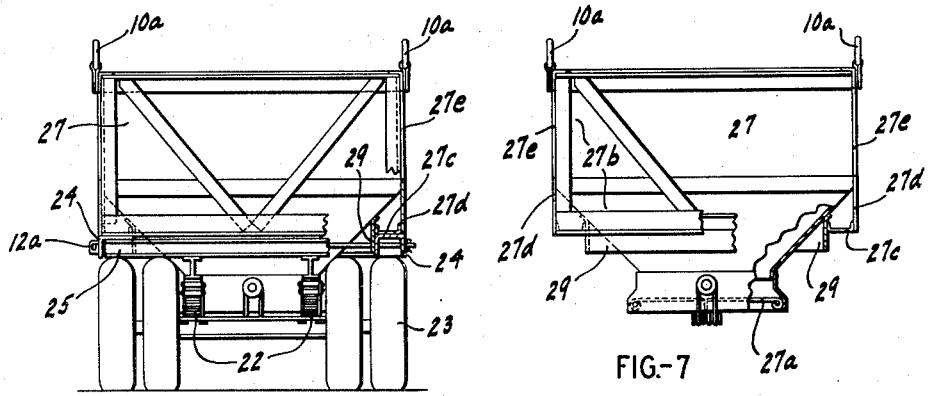
Figure 8:
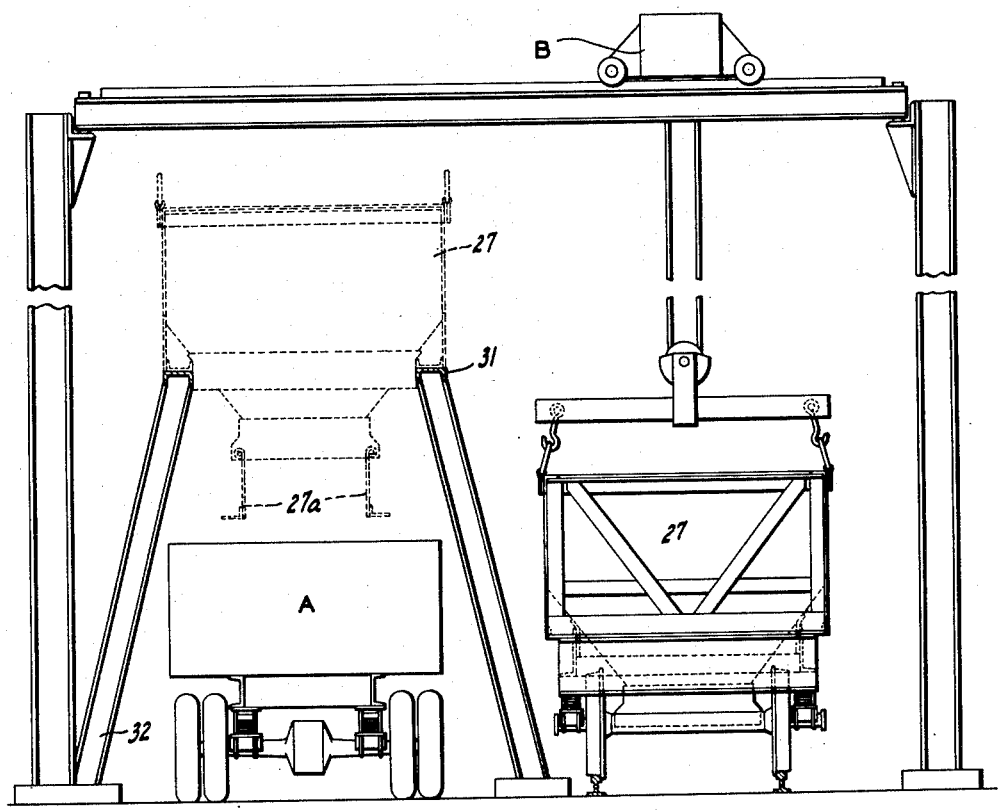
Figure 9:
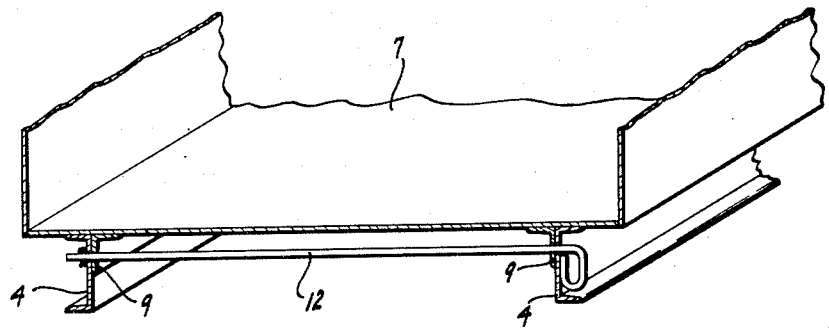

The exact nature of the invention together with further objects and advantages thereof will be apparent from the following description taken in connection with the accompanying drawings, which in a conventional manner illustrate an embodiment of the invention, and wherein Fig. 1 is a plan view of a rail chassis unit; Fig. 2 a side elevation of an assembly of such unit with a package container body unit mounted thereon, parts being broken away to show details of construction; Fig. 3 is an end elevation of the assembly shown in Fig. 2, parts being broken away to show details of construction, and in broken lines means being indicated for removal of the body from the chassis; Fig. 4 is a plan view showing a highway chassis unit; Figs. 5 and 6 are side and end elevations respectively, of an assembly of a bottom dumping body unit mounted upon such highway chassis unit, parts being broken away to show details of construction; Fig. 7 is an end elevation of the same dumping body unit, parts being broken away to show details; Fig. 8 is a conventionalized elevation illustrative of the manner of dispensing provided by this invention; and Fig. 9 is a perspective view showing conventionally an arrangement for securing body and chassis units in assembly.

With reference now to the drawings, the rail chassis includes a frame generally indicated at 1, mounted by springs 2 upon a pair of axle assemblies 3 which include the flanged wheels indicated. The frame 1 includes a pair of side frame members 4 interconnected at their ends by end frame members 5 and also interconnected intermediate their ends and between the axles, by transverse frame members 6, the frame being provided with standard rail couplings at its ends as indicated.

It will be apparent that the frame 1, although simply constructed of few elements, provides a large generally rectangular central opening $a$ transversely bounded by the side frame members 4 and bounded endwise by the transverse frame members 6.

With reference now to Figs. 2 and 3, a package container body unit generally indicated at 7, is provided having a bottom substantially coextensive with the frame 1 so that it may rest upon all of the frame members, the upper extremities of which lie in a plane, the body unit including sides and ends presumably interconnected by a roof. The body shown is provided with end doors 8 as indicated in Fig. 3.

For maintaining the position of the body unit upon the frame of the chassis unit, the bottom of the former is provided with pilot means downwardly projecting into the opening $a$ of the frame.

As here shown such pilot means comprises a downwardly extending flange 9 which may be formed by angle irons as indicated, disposed to fit peripherally within the frame opening $a$. Thus generally the body unit is supported upon the frame 1 and maintained in position thereupon by the described pilot means fitting within the frame opening. It may be observed that such pilot means substantially reinforces the bottom of the body, which is also reinforced by the disposition of the frame elements when the body is supported upon the frame.

For placement and removal of the body unit, it is provided with members 10 engageable by crane-operated hooks as indicated in broken lines in Fig. 3. The members 10 may be tied in with the transverse bottom reinforcing pilot members 9 as by structural members 11 at the sides of the body. Thus the pilot structure serves not only to locate the body unit upon the chassis frame but also serves in bracing the body particularly when the latter is being lifted.

Means are provided for securing the body unit in its assembly with the chassis unit. Such means are here conventionally illustrated as a pair of key bars 12, each extending transversely, adjacent one of the transverse pilot members 9, through registering openings in these pilot members and the side frame members 1, insertable and removable endwise by a handle at one end and securable at the other end as by a cotter pin.

With reference now to Fig. 4, the highway chassis comprises a frame generally indicated at 21 mounted upon pneumatic rubber tires for operation as a trailer. It is thus supported at its rear end by springs 22 upon a fixed axle assembly 23 having dual tires as indicated; and is supported at its forward end through a fifth wheel mounting 22a, upon a front axle assembly 23a provided with a drawbar 23b.

The frame 21 includes a pair of side frame members 24 interconnected by end members 25 and intermediate its ends by transverse frame members 26; suitable additional frame members being provided as indicated in Figs. 4 and 5 for mounting of the frame upon its running gear.

It will be observed that the frame 21 provides a large central opening $b$. The members of the frame are so proportioned and arranged according to this invention that the opening $b$ of the highway chassis frame is of the same dimensions as the opening $a$ of the rail chassis frame 1.

Thus it will be apparent that a body unit such as illustrated in Figs. 2 and 3, might be mounted upon the highway chassis unit just as upon the rail unit.

In Figs. 5 and 6, however, a bottom dumping body unit generally indicated at 27 is shown as mounted upon the highway chassis unit. Such dumping body has its load container generally of hopper form with sloping ends as indicated in Fig. 5, and with the bottom portion of its sides sloping as indicated in Figs. 6 and 7, and having for control of its bottom opening thus provided, a pair or more of dumping doors conventionally illustrated in the drawings and generally indicated by the reference character 27a. It is to be observed that the hopper container of the dumping body extends through the opening $b$ of the chassis frame and is proportioned to generally fit such opening. For support of the hopper container 27 upon the frame 21, the bottom dumping body is provided with bracket means generally indicated at 27b and including base members 27c adapted to rest upon the corresponding members of the frame. For maintaining the location of the body 27 upon the frame 21 peripheral pilot means 29 of flange form are provided, extending downwardly from the hopper container to fit within the opening $b$ of the frame, just as the pilot means 9 has been described as effective for the same purpose between the body 7 and the frame 1 of the rail chassis unit.

Obviously the arrangment described permits the bottom dumping body 27 to be removed upwardly from its supporting chassis frame just as in the case of the body 7, and crane hook engaging members 10a are provided for the purpose. These may be tied in with the side bearing members 27c as by longitudinal members 27d and vertical members 27e, by which arrangement the body is greatly reinforced.

Key bars 12a serve to removably secure the body and chassis units in their vehicle assembly exactly as before.

It will be apparent, the invention providing that the parts are so coordinated for the purpose, that either illustrated type of body unit may be employed optionally and interchangeably with either the rail or highway type of chassis unit to form a complete vehicle assembly.

Obviously types of body units other than the package container type of Figs. 2 and 3 and the bottom dumping type of Figs. 5, 6 and 7 might be constructed and similarly mounted upon either rail or highway chassis according to the teachings of this invention.

A typical transportation cycle contemplated by this invention will be loading of a body unit at a point of production, the type of body selected being suitable of course to the nature of the product, mounting such body unit if not already so mounted, upon a highway chassis unit, transporting the resultant vehicle assembly with its load via highway to a railroad, there transferring the loaded body unit to a rail chassis unit, transporting the resultant loaded vehicle assembly to a rail point of destination, transferring the loaded body unit to a second highway chassis unit, transporting the resultant highway vehicle assembly upon the highway to the destination and there unloading the body unit. Of course in highway operation a tractor is provided for propulsion of the highway vehicle assembly as a trailer. Obviously the procedure cycle just described is capable of innumerable variations dependent upon the circumstances.

With reference now to Fig. 8, a bottom dumping body unit 27 is illustrated mounted upon a rail chassis unit. A frame 31 capable of receiving the body unit 27 and of supporting the same beside the railroad track, is supported upon a stationary base 32 at sufficient elevation to permit a truck A to be driven under the body when the latter is mounted upon the frame 31. A crane generally indicated at B is provided for lifting the body from its position upon the rail chassis unit onto the stationary frame 31 as indicated in broken lines in Fig. 8. Thus the truck A or a number of trucks in succession may be loaded by gravity from the stationary elevated body by suitable manipulation of its dumping doors 27a. Obviously the bridge of the crane may be wider than illustrated so that a number of elevated bodies may be employed for selective dispensation in the plane transverse to the railroad track, or if the crane is of the traveling type with its bridge movable longitudinally of the railroad track, a number of longitudinally disposed dispensing stations may be provided.

What I claim is:

1. In a vehicle of the class described, a chassis including a frame providing a large unobstructed opening, and a body resting upon said frame and extending over said opening and having pilot means fitting peripherally within said opening for maintaining its position upon the frame, said body having lifting means for its removal from said chassis, and means arranged at the body sides for connecting said lifting means with said pilot means.

2. In a vehicle of the class described, a chassis including a frame having members arranged to define a large rectangular opening extending laterally between a pair of side frame members, and a body mounted upon said frame and overlying said frame members and having pilot means fitting within said opening for maintaining its position upon the frame, said pilot means including transverse members extending between said side frame members adjacent the ends of said opening, said body having lifting means for its removal from said chassis, and means arranged at the body sides for connecting said lifting means with said transverse pilot members.

3. In a vehicle of the class described, a body having sides and a bottom, a chassis including a frame having members arranged to define a large rectangular opening extending between a pair of frame members, said body being mounted on said frame and overlying said frame members, there being transverse pilot members on said body bottom fitting within said opening for maintaining its position upon the frame, said body having lifting means at the top of said body sides, and tension members connected with said lifting means and extending downwardly along said body sides and secured to said transverse pilot members.

4. The combination of claim 3 including means other than said body sides connecting said transverse pilot members and said tension members whereby to transmit pull on said tension members to said transverse pilot members.

ARTHUR P. ARMINGTON.